US010871142B2

(12) United States Patent
Hector, Jr. et al.

(10) Patent No.: US 10,871,142 B2
(45) Date of Patent: *Dec. 22, 2020

(54) APPARATUS AND METHOD FOR GENERATING ELECTRICITY WITH PRESSURIZED WATER AND AIR FLOW MEDIA

(71) Applicant: Hector Carroll, LLC, Raleigh, NC (US)

(72) Inventors: Francis Norbert Hector, Jr., Raleigh, NC (US); Juan Keith Carroll, Littleton, NC (US)

(73) Assignee: CARROLL HECTOR, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,894

(22) Filed: Apr. 15, 2019

(65) Prior Publication Data
US 2020/0080531 A1    Mar. 12, 2020

Related U.S. Application Data

(60) Provisional application No. 62/729,834, filed on Sep. 11, 2018.

(51) Int. Cl.
*F03B 15/06*  (2006.01)
*F03B 13/26*  (2006.01)
(Continued)

(52) U.S. Cl.
CPC ............ *F03B 15/06* (2013.01); *F03B 1/04* (2013.01); *F03B 11/004* (2013.01);
(Continued)

(58) Field of Classification Search
CPC ......... F03B 1/04; F03B 11/004; F03B 15/04; F03B 11/002; F03B 15/06; F03B 13/266; F03B 17/06; H02J 3/382
See application file for complete search history.

(56) References Cited

U.S. PATENT DOCUMENTS

| 4,001,597 A * | 1/1977 | Graff ................. F03B 13/181 |
| | | 290/53 |
| 6,718,761 B2 * | 4/2004 | Merswolke ............ F03D 9/008 |
| | | 60/398 |

(Continued)

FOREIGN PATENT DOCUMENTS

IN    201721045318 A    4/2018

OTHER PUBLICATIONS

IN Publication No. 0737DEL06 Asokan et al., "Composition used for preparing non-hazardous building blocks, comprises hazardous jarosite waste released during metallic zinc extraction in hydrometallurgical process, and two structural materials in preset mass ratio", Dec. 12, 2013 (Year: 2013).*

(Continued)

*Primary Examiner* — Viet P Nguyen
(74) *Attorney, Agent, or Firm* — Shumaker, Loop & Kendrick, LLP

(57) ABSTRACT

A facility for generating electricity, including a water source and a plurality of penstocks adapted for selective flow communication with the water source for delivering water from the water source to a turbine electricity generator. An electricity distribution system is provided having a first component adapted to deliver electricity generated by the turbine electricity generator to an electric grid and an alternative second component adapted to use the electricity to power an air compressor. A compressed air storage reservoir is provided for storing air compressed by the air compressor, including an outlet for selectively delivering the compressed air to the plurality of penstocks according to a predetermined sequence for providing energy to the water contained in the penstock to propel the water from the penstock to the turbine.

11 Claims, 10 Drawing Sheets

(51) Int. Cl.
  *H02J 3/38* (2006.01)
  *F03B 17/06* (2006.01)
  *F03B 1/04* (2006.01)
  *F03B 11/00* (2006.01)
  *F03B 15/04* (2006.01)

(52) U.S. Cl.
  CPC ............ *F03B 13/266* (2013.01); *F03B 15/04* (2013.01); *F03B 17/06* (2013.01); *H02J 3/382* (2013.01); *F05B 2210/18* (2013.01); *F05B 2220/32* (2013.01); *F05B 2270/337* (2013.01)

(56) References Cited

U.S. PATENT DOCUMENTS

| | | | |
|---|---|---|---|
| 9,790,703 | B1 | 10/2017 | Hector, Jr. et al. |
| 2008/0303282 | A1* | 12/2008 | Ziegenfuss ........... F03B 17/005 290/52 |
| 2009/0250934 | A1* | 10/2009 | Bozano ................ F03B 13/145 290/53 |
| 2009/0282822 | A1 | 11/2009 | McBride et al. |
| 2009/0320459 | A1* | 12/2009 | Frye ..................... F03B 13/148 60/398 |
| 2014/0216022 | A1 | 8/2014 | Jiang |
| 2014/0234123 | A1* | 8/2014 | McBride ................ F02B 23/04 417/53 |
| 2015/0052885 | A1* | 2/2015 | Meager ................... F16L 55/07 60/398 |
| 2015/0113968 | A1* | 4/2015 | Christensen .......... F01K 27/005 60/325 |
| 2015/0275849 | A1* | 10/2015 | Sieber ..................... F03B 13/14 60/327 |
| 2017/0065908 | A1* | 3/2017 | Charhut ............. B01D 21/2455 |
| 2017/0204738 | A1* | 7/2017 | Barakat .................. F03D 9/008 |
| 2018/0180019 | A1* | 6/2018 | Jiang ..................... H02J 15/006 |
| 2019/0242357 | A1* | 8/2019 | Mesinger ................ F03B 13/06 |
| 2019/0383260 | A1* | 12/2019 | Frye ..................... F03B 17/025 |
| 2020/0080538 | A1* | 3/2020 | Hector, Jr. ............. F03B 11/004 |
| 2020/0191109 | A1* | 6/2020 | Hector, Jr. .............. F03B 13/08 |

OTHER PUBLICATIONS

International Search and Written Opinion report for related Application No. PCT/US2019/050153 dated Nov. 12, 2019. 14 pages.

\* cited by examiner

APPARATUS AND METHOD FOR GENERATING ELECTRICITY WITH PRESSURIZED WATER AND AIR FLOW MEDIA

PRIORITY CLAIM

This application claims priority from and incorporates by reference U.S. Provisional Patent Application Ser. No. 62/729,834, filed Sep. 11, 2018.

TECHNICAL FIELD AND BACKGROUND OF THE INVENTION

This invention relates to an apparatus and method for generation of electricity using pressurized water and air as respective flow media, working together to achieve more uniform and efficient electricity generation. Pump storage generation of electricity is well-known and is a type of hydroelectric energy storage used by electric power systems for load balancing. The method stores energy in the form of gravitational potential energy of water, pumped from a lower elevation reservoir to a higher elevation reservoir. Low-cost surplus off-peak electric power is typically used to operate the pumps. During periods of high electrical demand, the stored water in the higher elevation reservoir is released and allowed to fall through turbines to produce electric power. Although the inherent losses of the pumping process make such a facility an overall net consumer of energy, the system increases revenue by allowing the utility to sell more electricity during periods of peak demand when electricity prices are highest.

Pumped-storage hydroelectricity allows energy from intermittent sources, such as solar, wind, and other renewable sources, or excess electricity from continuous base-load sources such as coal or nuclear, to be saved for periods of higher demand. Because of the need to replenish the supply of stored water, pump hydro facilities are most often used with reservoirs upstream of a hydroelectric facility, with water being circulated as needed to balance load demand with supply.

The present invention is not a "pump storage" apparatus and method. Rather, the disclosed invention supplements a supply of water at a high elevation with compressed air generated according to one of several alternatives. As described in this application the supply of water is from, for example, a flowing river, conduit, canal or the like. Rather than using off-peak water flow to pump water back up to a higher elevation for later use, the water flow may be continuous from an upstream source, through a turbine and downstream. It is the use to which the water is put at any given time that results in the efficiency of the system described in this application. Electricity generated during peak demand periods is delivered to the grid for use by consumers, and electricity generated during off-peak demand periods is delivered to an air compressor, which compresses and stores the compressed air for use as a supplemental energy source which, in combination with the flowing water, provides increased and more uniform flow that can balance water flow rates and mimic the power of water falling from a high elevation in a system where the upstream intake is not significantly higher than the discharge end of the system. One feature of the invention is the use of residue from the generation of electricity by coal, such as CCR ("coal combustion residual") to serve the beneficial purpose of providing an encasement of the operating components of the system with enhanced efficiency. The system described in the application avoids the need to pump water up an incline into a storage reservoir and instead uses the electricity to compress air during off-peak usage periods.

SUMMARY OF THE INVENTION

It is therefore an object of the present invention to provide an apparatus and method for generation of electricity using pressurized water and air as respective flow media, working together to achieve more efficient electricity generation.

It is another object of the invention to provide an apparatus and method for generation of electricity using pressurized water and air that enables electricity to be generated without the need for a physical drop of the flow media to create the force necessary to operate a turbine generator.

It is another object of the invention to provide an apparatus and method for generation of electricity using pressurized water and air that uses CCR as a construction material to enclose some or all of the operating components of the system.

It is another object of the invention to provide an apparatus and method for generation of electricity using a comminuted flow medium, for example, flowable solids such as stone, ceramic, metal, resins and the like.

According to one aspect of the invention, a facility for generating electricity is provided, that includes a water source; a plurality of penstocks adapted for selective flow communication with the water source for delivering water from the water source to a turbine electricity generator and an electricity distribution system having a first component adapted to deliver electricity generated by the turbine electricity generator to an electric grid and a second component adapted to use electricity to power an air compressor. A compressed air storage reservoir is provided for storing air compressed by the air compressor, and includes an outlet for selectively delivering the compressed air to the plurality of penstocks according to a predetermined sequence for providing energy to the water contained in the selected penstock to propel the water from the penstock to the turbine.

According to one another aspect of the invention, at least a portion of the facility components are contained within a structure constructed at least in part of coal combustion residual.

According to one another aspect of the invention, the water source is selected from the group consisting of a river, channel, canal, lake, or CCR pond and a water intake is positioned between the water source and the plurality of penstocks. Each of the plurality of penstocks includes a water inflow valve adapted to control the flow of water from the water source to the penstock. A water outflow valve is adapted to control the flow of water from the penstock to the turbine electricity generator. A compressed air inflow valve is adapted to control the flow of compressed air from the compressed air storage reservoir to the penstock. The penstocks converge to form a single outflow to the turbine electricity generator. An electronic control is provided for controlling the operation of the water inflow valves, the water outflow valves and the compressed air inflow valves.

According to one another aspect of the invention, the compressed air is in flow communication with the water in the selected penstock.

According to one another aspect of the invention, each of the penstocks includes a piston positioned in the penstock downstream from the compressed air inflow valve and movable downstream within the penstock by compressed air discharged from the compressed air inflow valve on an upstream side of the piston.

According to one another aspect of the invention, the water intakes are laterally offset from the respective penstocks and connect to a respective penstock for water flow into the penstocks at a position downstream of the compressed air inflow valves and upstream of the water outflow valves. A piston is positioned in each of the penstocks upstream of the respective water outflow valve and downstream of the respective compressed air inflow valve and is movable downstream within the penstocks by compressed air discharged from the compressed air inflow valve on the upstream side of the piston.

According to one another aspect of the invention, a facility for generating electricity is provided that includes a water source and a plurality of penstocks adapted for selective flow communication with the water source for delivering water from the water source to a turbine electricity generator. An electricity distribution system is provided having a first component adapted to deliver electricity generated by the turbine electricity generator to an electric grid and an alternative second component adapted to use the electricity to power an air compressor. A compressed air storage reservoir is provided for storing air compressed by the air compressor, and includes an outlet for selectively delivering the compressed air to the plurality of penstocks according to a predetermined sequence for providing energy to the water contained in the selected penstock to propel the water from the penstock to the turbine. A structure constructed at least in part of coal combustion residual is provided and within which at least some of the operating components of the facility are positioned. A water intake is positioned between the water source and the plurality of penstocks. Each of the plurality of penstocks includes a water inflow valve adapted to control the flow of water from the water source to the penstock. A water outflow valve is adapted to control the flow of water from the penstock to the turbine electricity generator and a compressed air inflow valve is adapted to control the flow of compressed air from the compressed air storage reservoir to the penstock.

According to one another aspect of the invention, the penstocks converge to form a single outflow to the turbine electricity generator; and an electronic control is provided for controlling the operation of the water inflow valves, the water outflow valves and the compressed air inflow valves.

According to one another aspect of the invention, the compressed air is in flow communication with the water in the selected penstock, each of the penstocks includes a piston positioned in the penstock downstream from the compressed air inflow valve and is movable downstream within the penstock by compressed air discharged from the compressed air inflow valve on an upstream side of the piston.

According to one another aspect of the invention, the water intakes are laterally offset from the respective penstocks and connect to a respective penstock for water flow into the penstocks at a position downstream of the compressed air inflow valves and upstream of the water outflow valves. A piston is positioned in each of the penstocks upstream of the respective water outflow valve and downstream of the respective compressed air inflow valve and is movable downstream within the penstocks by compressed air discharged from the compressed air inflow valve on the upstream side of the piston.

According to one another aspect of the invention, method of generating electricity is provided and includes the steps of providing a water source, a plurality of penstocks adapted for selective flow communication with the water source for delivering water from the water source to a turbine electricity generator, an electricity distribution system having a first component adapted to deliver electricity generated by the turbine electricity generator to an electric grid and an alternative second component adapted to use the electricity to power an air compressor; and a compressed air storage reservoir for storing air compressed by the air compressor, and an outlet for delivering the compressed air to the plurality of penstocks for providing energy to the water contained in the selected penstock to propel the water from the penstock to the turbine. Water is diverted from the water source into the plurality of penstocks and the water is delivered downstream to a turbine electricity generator where electricity is generated. A predetermined portion of the electricity is delivered to an air compressor for compressing air for storage in a compressed air storage reservoir. The compressed air is delivered to the penstocks for propelling the water down the penstock to the turbine electricity generator.

According to one another aspect of the invention, the step of delivering the compressed air to the penstocks is according to a predetermined repeating sequence.

According to one another aspect of the invention, the method includes the step of containing at least a portion of the facility components within a structure constructed at least in part of coal combustion residual.

According to one another aspect of the invention, the method includes the step of providing a piston positioned in each penstock downstream from the respective compressed air inflow valve and movable downstream within the penstock by compressed air discharged from the compressed air inflow valve on an upstream side of the piston.

According to one another aspect of the invention, the method includes the step of laterally offsetting the water intakes from the respective penstocks and connecting the water intakes to a respective penstock for water flow into the penstocks at a position downstream of the compressed air inflow valves and upstream of the water outflow valves.

According to one another aspect of the invention, the method includes the step of positioning a piston in each of the penstocks upstream of the respective water outflow valve and downstream of the respective compressed air inflow valve and moving the piston downstream within the penstocks by compressed air discharged from the compressed air inflow valve on the upstream side of the piston.

According to one another aspect of the invention, the method includes the steps of during time periods of relatively high electricity demand, delivering the electricity to an electricity grid and during time periods of relatively low electricity demand delivering the electricity to the air compressor.

According to one another aspect of the invention, the method includes the step of splitting the delivery of electricity from the turbine electricity generator to an electricity grid and the air compressor according to a formula wherein the grid has electricity priority with any excess electricity being delivered to the air compressor.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
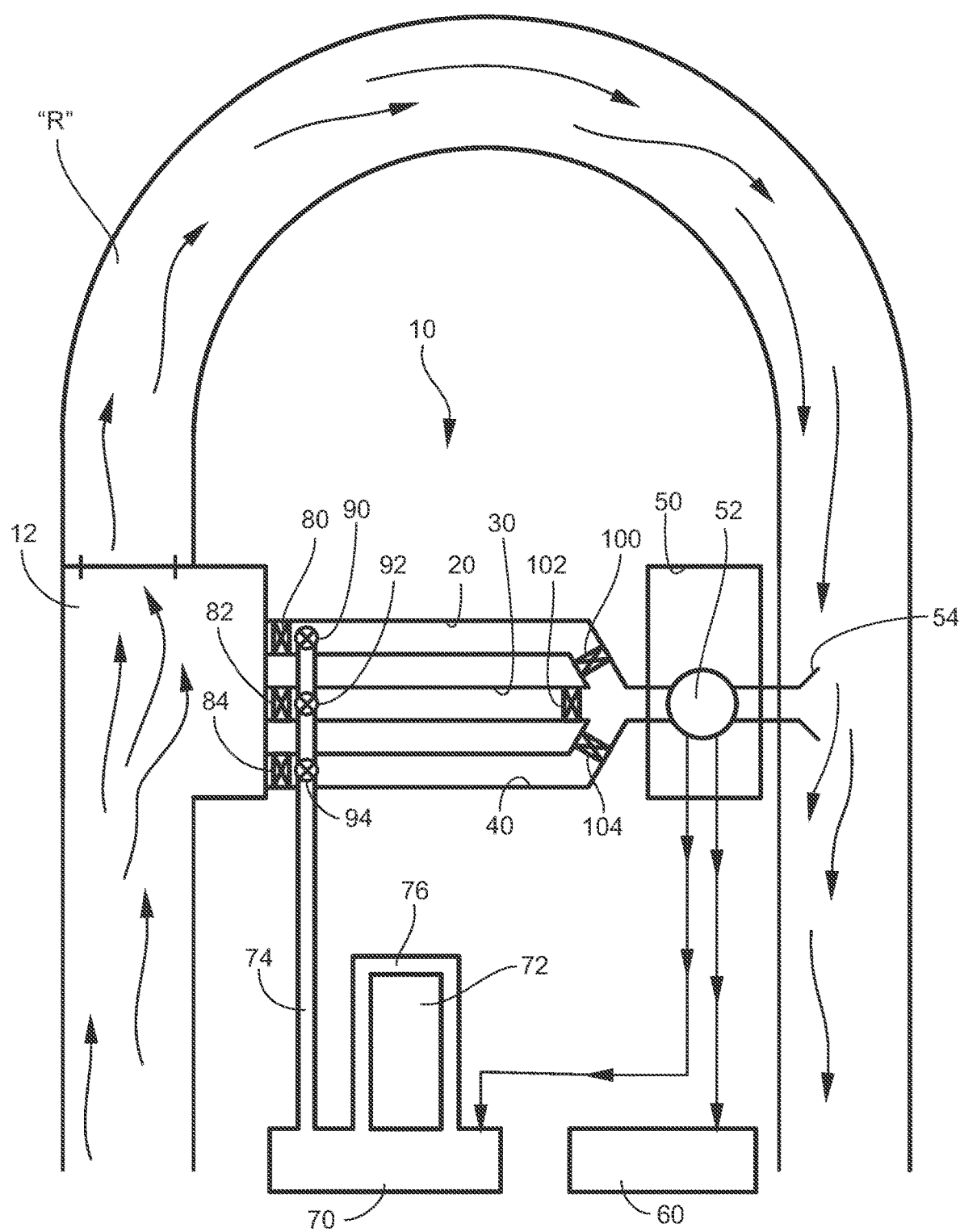
FIGS. 1-4 are schematic sequential plan views of an apparatus and method for generation of electricity using pressurized water and air as respective flow media.

Referring now to the drawings, a facility 10 for generating electricity according to one embodiment is shown in FIGS. 1-4. The facility 10 is sited in, for example, a horseshoe bend in a river, a manmade channel or canal "R". As shown in the drawings the river R has a gravity-induced flow indicated by arrows in the streambed. As water flows past the upstream side of the facility 10, water is diverted by an intake 12 into three penstocks 20, 30 and 40 that deliver the water under pressure to a power house 50 in which is housed a turbine generator 52. The water exits the power house 50 through an outlet 54 and flows back into the river R where it joins the water in the river R and flows downstream. Electricity generated in the power house 50 is delivered during peak loads to a power grid 60 for use by customers or during off peak load times to an electrically-powered air compressor 70 that takes environmental air, pressurizes it and stores it in a compressed air storage reservoir 72. An outlet 74 from the reservoir 72 delivers air to the penstocks 20, 30 and 40 as described below. As needed, power can be scavenged from the grid to generate further compressed air depending on the level of power usage and the availability of excess power from the grid.

Preferably, the facility 10, or parts thereof such as the air storage reservoir 72 are encased in, for example, a structure of earth or a mixture of coal combustion residual ("CCR") and other materials 76 to efficiently protect the facility 10 from environmental effects. The use of CCR is a beneficial use that provides a means of efficiently utilizing an otherwise unusable waste material of which there presently exists many millions of tons. Alternatively, in addition to CCR static structures for housing the air storage reservoir 72, this invention could also be used with other types of storage systems. Salt mines being an example of other types of storage systems.

As shown in FIGS. 1-4, the flow of water and compressed air to and from the penstocks 20, 30 and 40 is controlled by valves. Water inflow valves 80, 82 and 84 are controlled to selectively allow water to flow into the penstocks 20, 30 and 40, respectively, from the intake 12. Compressed air inflow valves 90, 92 and 94 are controlled to selectively allow compressed air to flow from the air storage reservoir 72 into the penstocks 20, 30 and 40. Water outflow valves 100, 102 and 104 are controlled to selectively allow water to flow out of the penstocks 20, 30 and 40, respectively, to the turbine 52. The sequencing and operation of the facility is controlled by suitable software that is programmed to monitor operation of the facility 10 and open and close valves according the description of this application.

FIG. 1 illustrates a closed state where the facility 10 is not operating and the water in the river R bypasses the facility 10 according to its usual flow.

Figure 2:
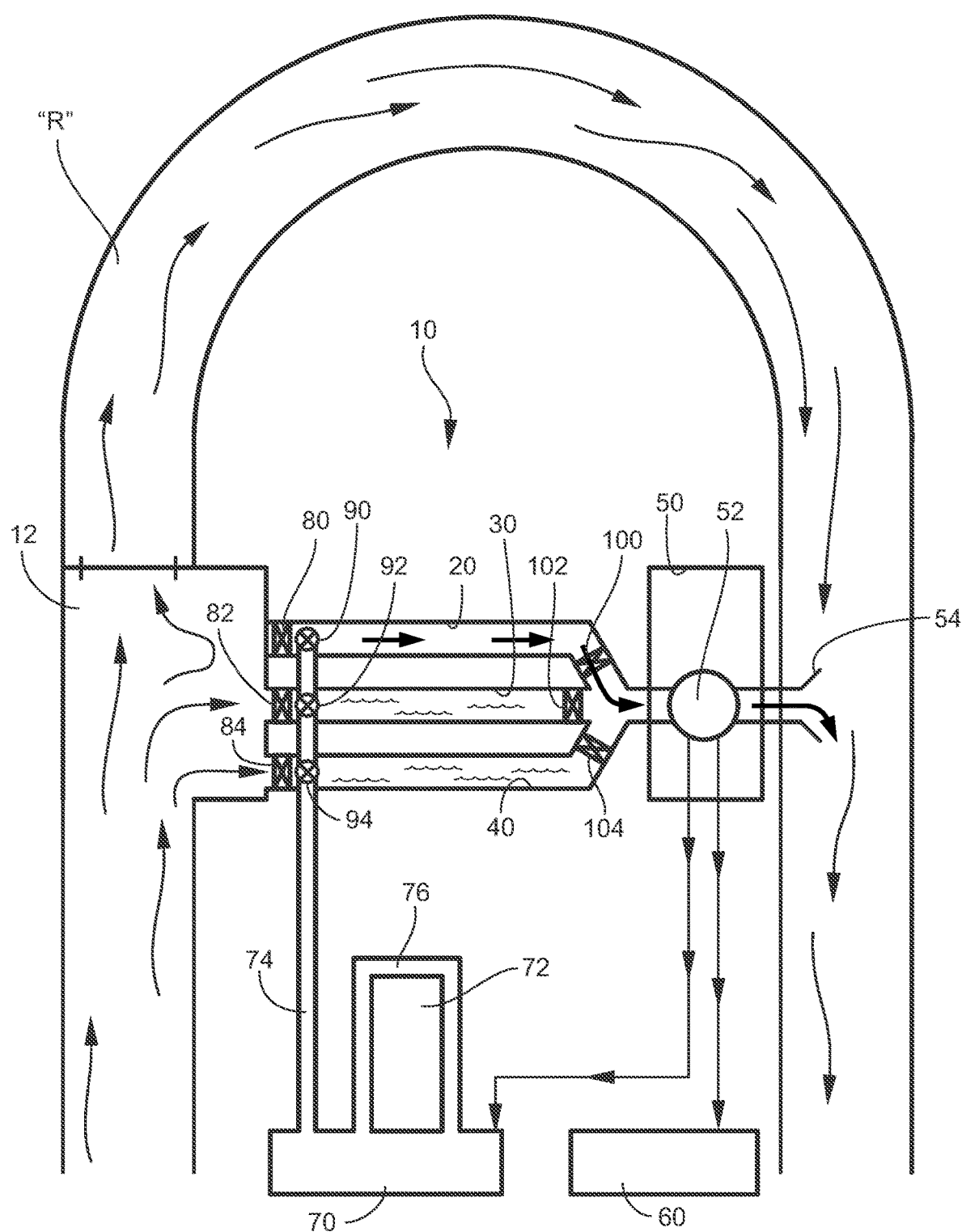

In FIG. 2, water has flowed into penstock 20 through open water inflow valve 80, and the water inflow valve 80 has then closed. The penstock 20, full of water, is charged with compressed air that flows into the upstream end of the penstock through the open compressed air inflow valve 90. The compressed air substantially increases the pressure in the penstock 20. The water outflow valve 100 opens and the pressurized water discharges into the power house 50, past the turbine 52 and back into the river R through the outlet 54. Penstocks 30 and 40 are filling or full of water while the water in penstock 20 is discharging.

Figure 3:
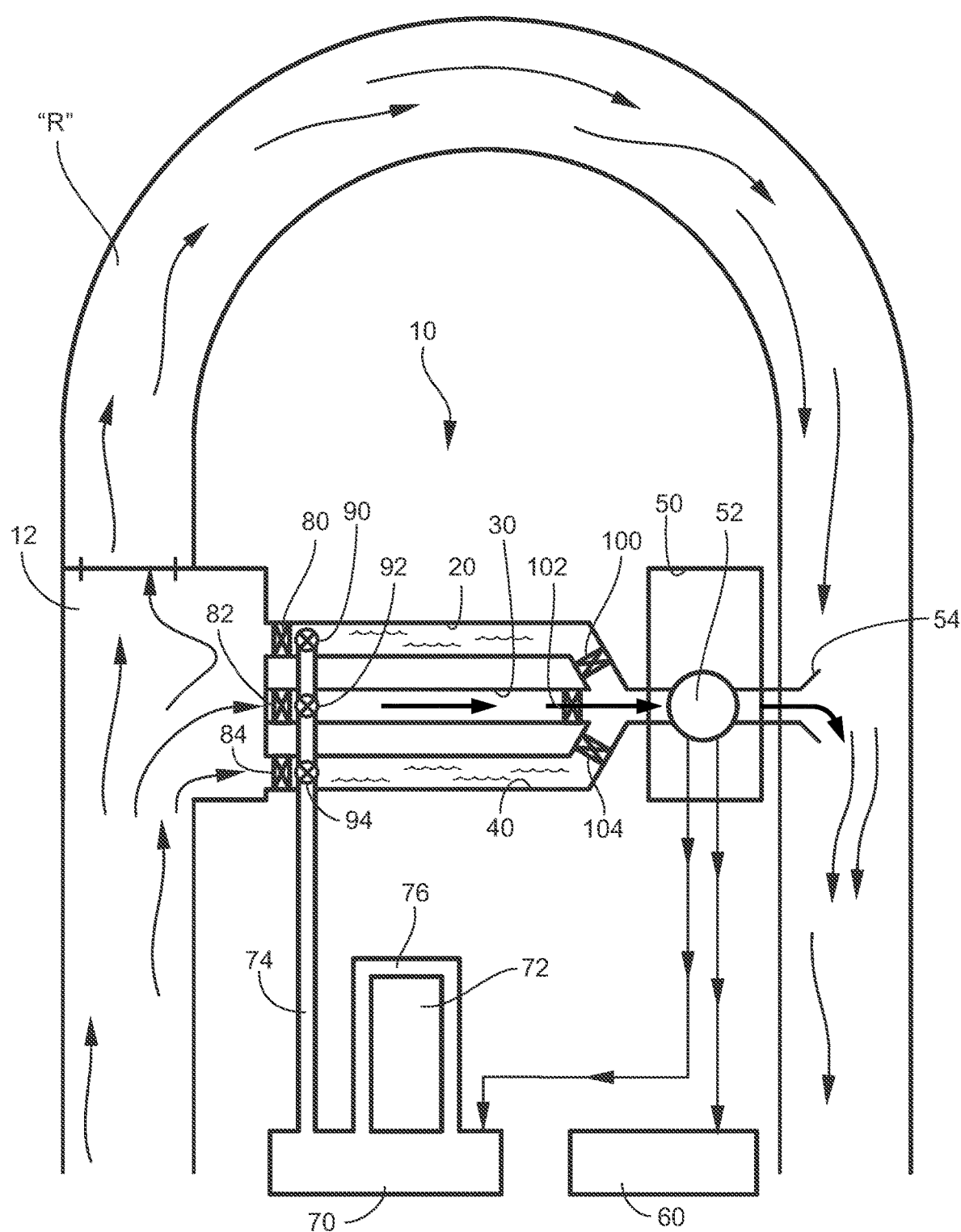

Referring now to FIG. 3, penstock 20 has emptied and has been refilled by closing the water outflow valve 100 and opening water inflow valve 80. The compressed air inflow valve 90 is also closed. As water is discharging from penstock 20, penstock 30 is fully charged with water. Water inflow valve 82 is closed and the compressed air inflow valve 92 is closed. Water outflow valve 102 is sequenced to open and allow water in the penstock 30 to discharge into the power house 50 and turbine 52 as the last of the water in penstock 20 is discharged through the turbine 52. The process for the penstock 30 sequences as did the process for penstock 20.

Figure 4:
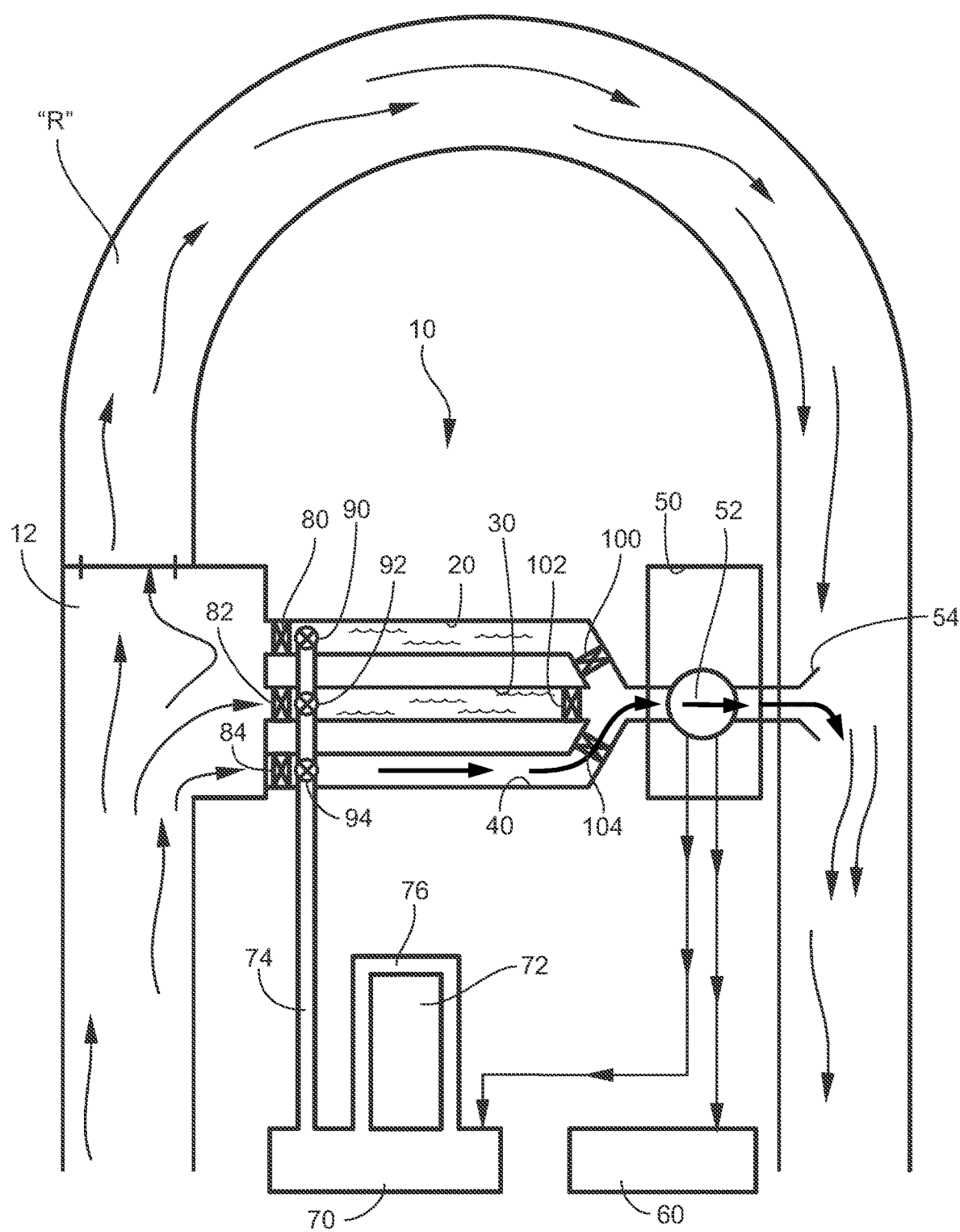

Referring to FIG. 4, the water inflow valve 80 opens to allow water to flow into penstock 20, while the water outflow valve 100 and the compressed air inflow valve 90 close.

As water is discharging from penstock 30, penstock 40 is fully charged with water. Water inflow valve 84 is closed and the compressed air inflow valve 94 is closed. Water outflow valve 104 is sequenced to open and allow water in the penstock 40 to discharge into the power house 50 and turbine 52 as the last of the water in penstock 30 is discharged through the turbine 52. The process for the penstock 40 sequences as did the process for penstock 30. During operation of the facility 10, the above-described sequence repeats itself under the control of the programmed software. As penstock 40 empties, water inflow valve 84 opens to allow water to flow from the water intake 12 into penstock 40, while water outflow valve 104 and the compressed air inflow valve 94 closes.

The penstocks 20, 30 and 40 may be angled within a wide range as required by the geography of the river R or other factors. Of particular importance is the ability of the penstocks 20, 30 and 40 to be at a very shallow angle, since the flow of water is not dictated by the angle of water downflow but by the impetus of the compressed air on the water, whether or not in addition to downflow resulting from the downflow angle of the penstocks 20, 30 and 40. As may be desirable due to various factors, the angles of the penstocks 20, 30 and 40 may be different, with the water flow rates adjusted as needed by the pressure and volume of the air being discharged into the penstocks 20, 30 or 40 at any given time.

Referring now to FIGS. 5-9, a facility 150 for generating electricity according to one embodiment is shown. The facility 150 is sited in, for example, a horseshoe bend in a river or a manmade channel or canal "R". As shown in the drawings, the river R has a gravity-induced flow indicated by arrows in the streambed. As water flows past the upstream side of the facility 150, water is diverted by water intakes 152, 154, 156 into three respective penstocks 160, 170 and 180 that deliver the water under pressure to a power house 190 in which is housed a turbine generator 192. The water exits the power house 190 through an outlet 194 and flows back into the river R where it joins the water in the river R and flows downstream. Electricity generated in the power house 190 is delivered during peak loads to a power grid 200 for use by customers or during off peak load times to an electrically-powered air compressor 210 that takes environmental air, pressurizes it and stores it in a compressed air storage reservoir 212. An outlet 214 from the reservoir 212 delivers air to the penstocks 160, 170 and 180 as described below.

Preferably, the facility 150, or parts thereof such as the air storage reservoir 212 is encased in, for example, a structure of earth or a mixture of coal combustion residual ("CCR") and other materials 216 to efficiently protect the facility 150 from environmental effects. The use of CCR is a beneficial use that provides a means of efficiently utilizing an otherwise unusable waste material of which there presently exists many millions of tons.

As also shown in FIGS. 5-9, the flow of water and compressed air to and from the penstocks 160, 170 and 180 is controlled by valves. Water inflow valves 220, 222 and 224 are controlled to selectively allow water to flow into the penstocks 160, 170 and 180, respectively, from the intakes 152, 154 and 156. Compressed air inflow valves 230, 232 and 234 are controlled to selectively allow compressed air to flow from the outlet 214 of the air storage reservoir 212 into the penstocks 160, 170 and 180. Water outflow valves 240, 242 and 244 are controlled to selectively allow water to flow out of the penstocks 160, 170 and 180, respectively, to the turbine 192. The penstocks 160, 170, and 180 include pistons 162, 172, and 182, respectively that are positioned for movement in the penstocks 160, 170 and 180 downstream of the compressed air inflow valves 230, 232 and 234, and upstream of the water outflow valves 240, 242 and 244.

The sequencing and operation of the facility is controlled by suitable software that is programmed to monitor operation of the facility 150 and open and close valves according the description of this application.

Figure 5:
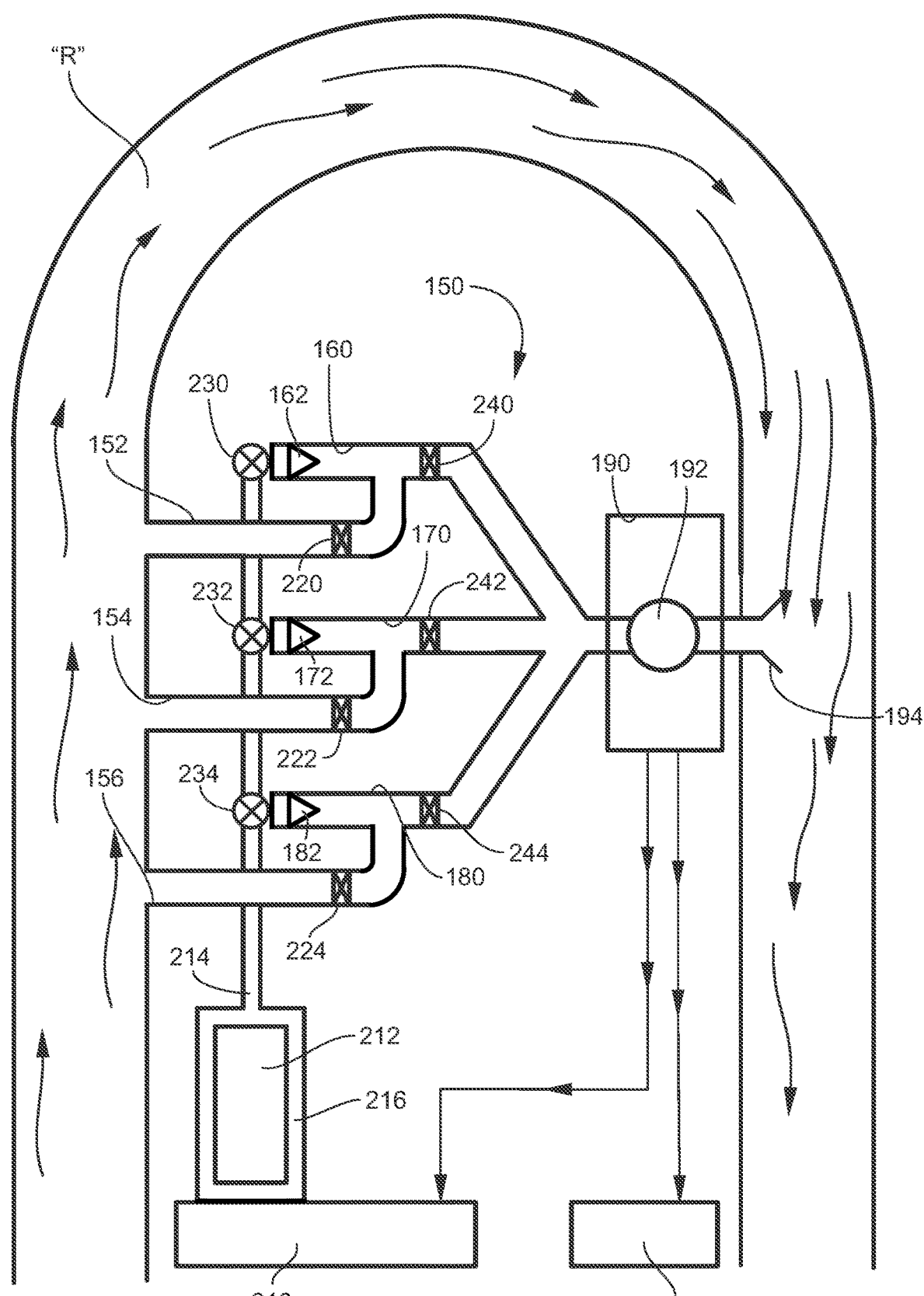
FIGS. 5-9 are alternative schematic sequential plan views of an apparatus and method for generation of electricity using pressurized water and air as respective flow media.

FIG. 5 illustrates a closed state where the facility 150 is not operating and the water in the river R bypasses the facility 150 and assumes its usual flow.

Figure 6:
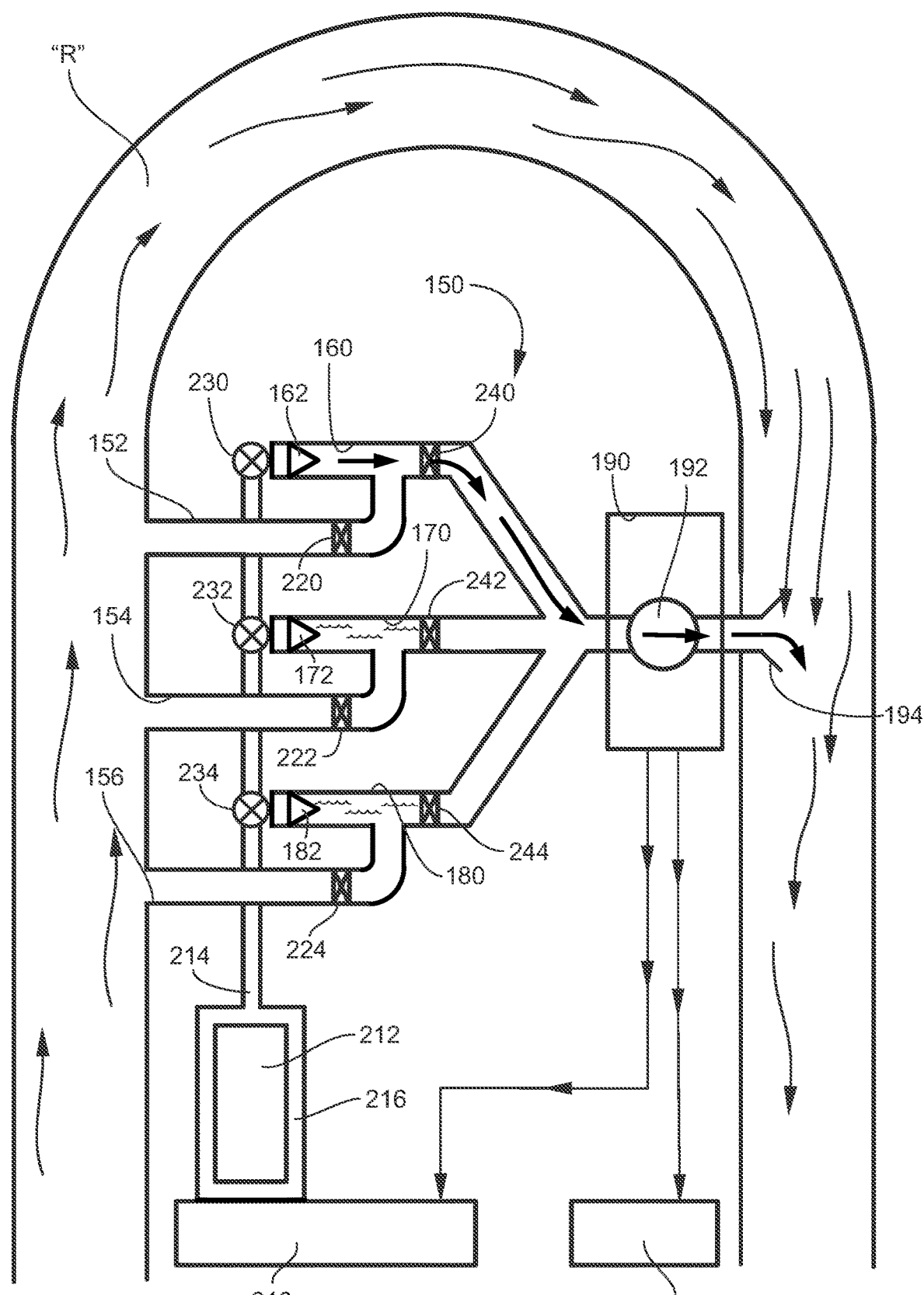

In FIG. 6, water has flowed into penstock 160 through open water inflow valve 220, and the water inflow valve 220 has closed. The penstock 160, full of water, is charged with compressed air that flows into the upstream end of the penstock 160 through the open compressed air inflow valve 230. The compressed air substantially increases the pressure in the penstock 160 upstream of the piston 162. The water outflow valve 240 opens and the pressurized water propels the piston 162 downstream in the penstock 160, causing the water to discharge into the power house 190, past the turbine 192 and back into the river R through the outlet 194. Penstocks 170 and 180 are filling or full of water while the water in penstock 160 is discharging.

Figure 7:
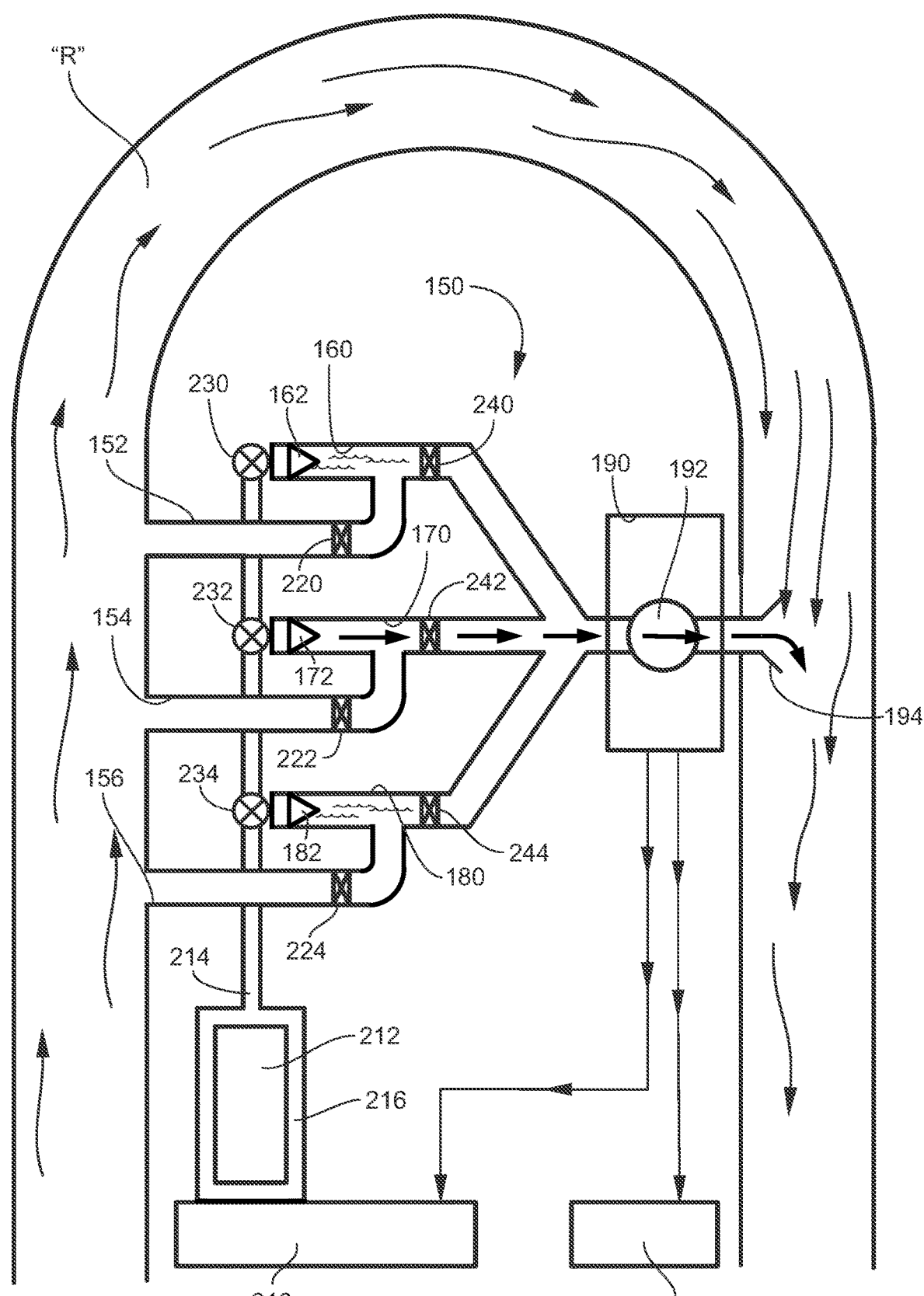

Referring now to FIG. 7, penstock 160 has emptied and has been refilled by closing the water outflow valve 240 and opening water inflow valve 220. The compressed air inflow valve 230 is also closed. As water is discharging from penstock 160, penstock 170 is fully charged with water. Water inflow valve 172 is closed and the compressed air inflow valve 232 is closed.

Water outflow valve 242 is sequenced to open and allow water in the penstock 170 to discharge into the power house 190 and turbine 192 as the last of the water in penstock 160 is discharged through the turbine 192. The process for the penstock 170 sequences as did the process for penstock 160.

Figure 8:
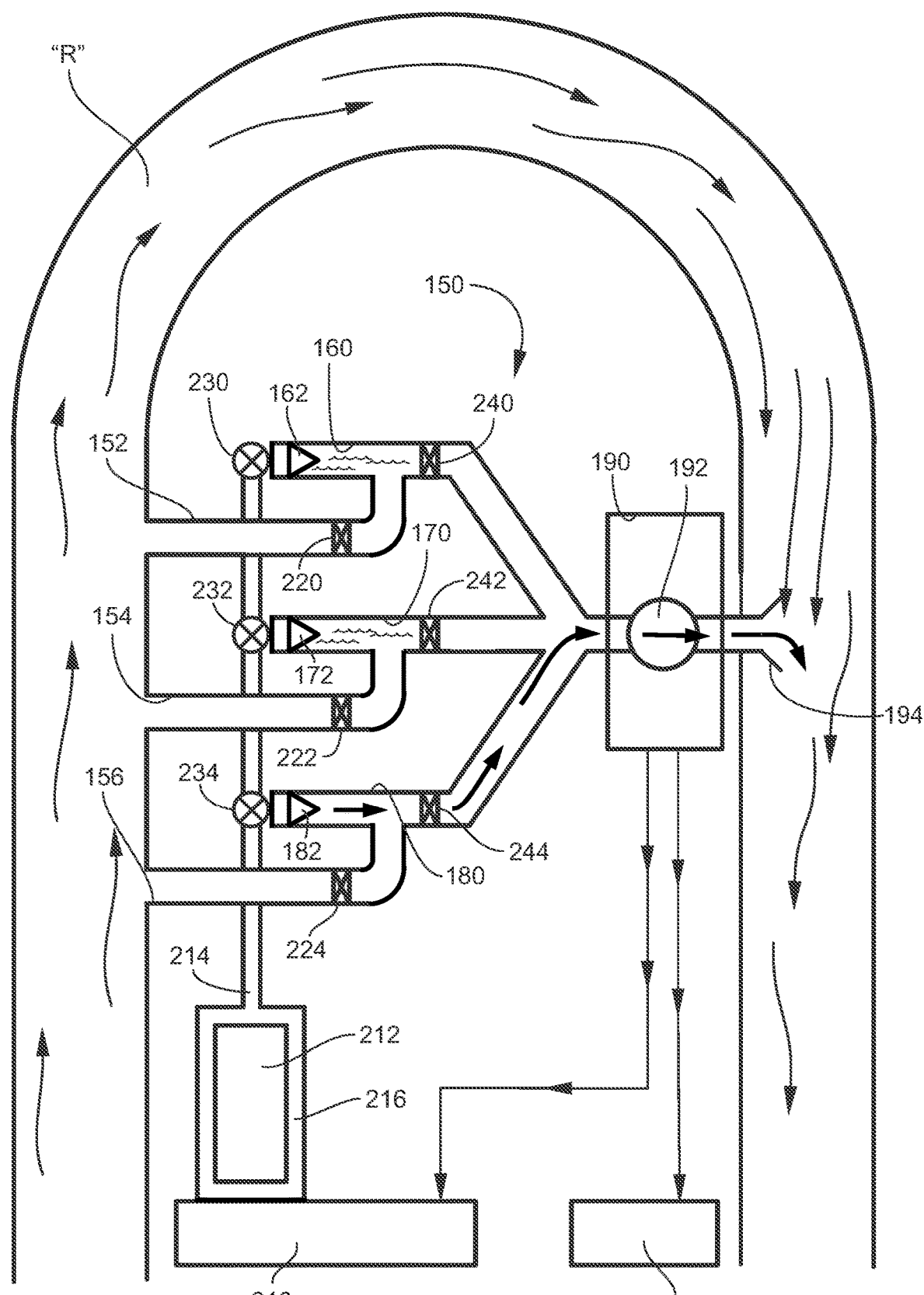

Referring to FIG. 8, the water inflow valve 220 opens to allow water to flow into penstock 160, while the water outflow valve 240 and the compressed air inflow valve 230 close. The water flowing into the penstock 160 through the water inflow valve 220 pushes the piston upstream in the penstock 160 and into its ready position shown in FIG. 8.

As water is discharging from penstock 170, penstock 180 is fully charged with water. Water inflow valve 224 is closed and the compressed air inflow valve 234 is closed. Water outflow valve 244 is sequenced to open and allow water in the penstock 180 to discharge into the power house 190 and turbine 192 as the last of the water in penstock 170 is discharged through the turbine 192. The process for the penstock 180 sequences as did the process for penstock 170. During operation of the facility 150, the above-described sequence repeats itself under the control of the programmed software. As penstock 180 empties, water inflow valve 224 opens to allow water to flow from the water intake 156 into penstock 180, while water outflow valve 244 and the compressed air inflow valve 234 closes.

The penstocks 160, 170 and 180 may be angled within a wide range as required by the geography of the river R or other factors. Of particular importance is the ability of the penstocks 160, 170 and 180 to be at a very shallow angle, since the flow of water is not dictated by the angle of water downflow but by the impetus of the compressed air-driven pistons 162, 172, 182 on the water, whether or not in addition to downflow resulting from the downflow angle of the penstocks 160, 170 and 180. As may be desirable due to various factors, the angles of the penstocks 160, 70 and 180 may be different, with the water flow rates adjusted as needed by the pressure and volume of the air being discharged into the penstocks 160, 170 or 180 at any given time.

Figure 9:
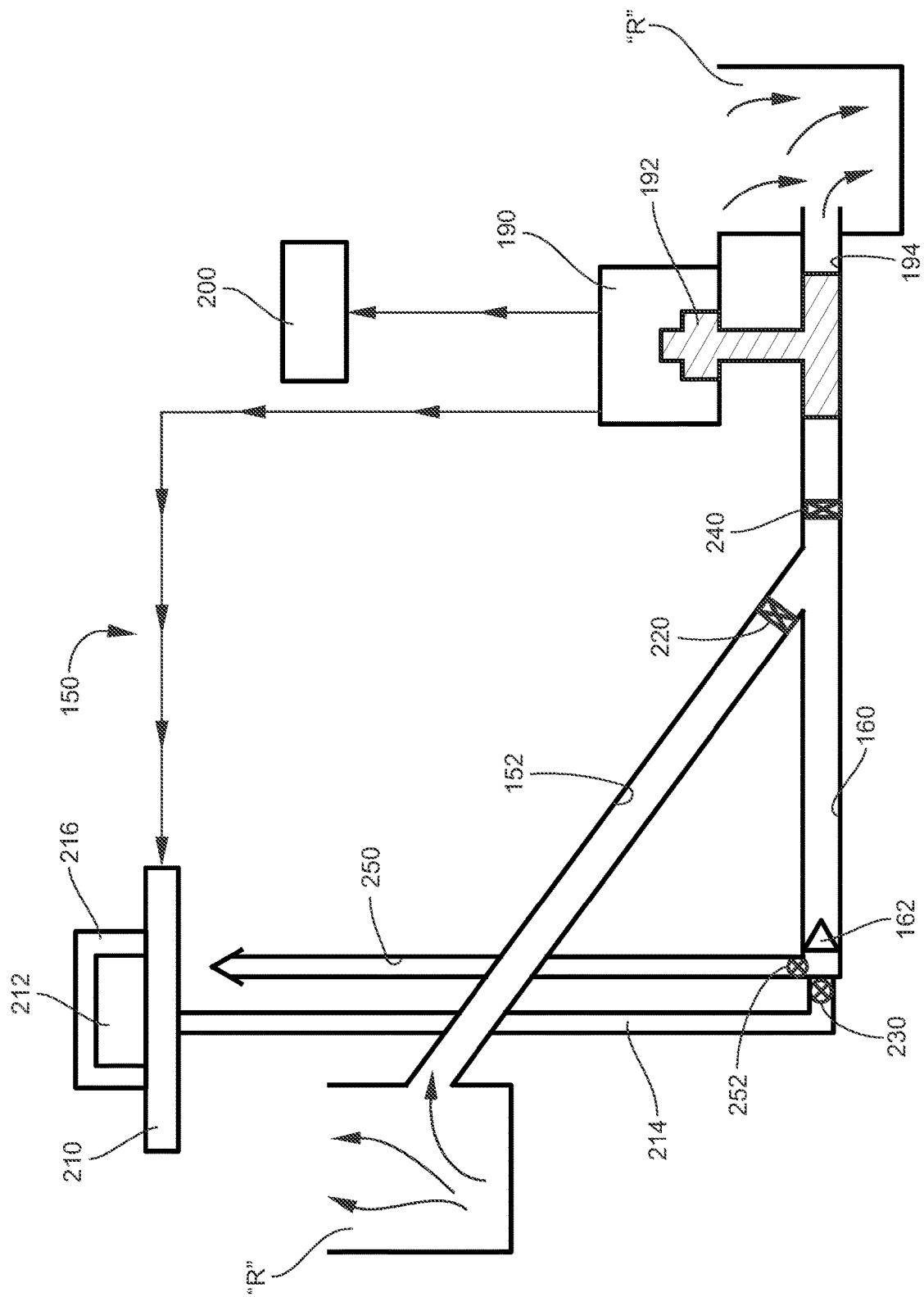

As shown in FIG. 9, an air vent 250 controlled by an air valve 252 allows air to vent to the environment as the angle of the water intake 152 permits water to flow down to the level of the penstock 160 through the open water inflow valve 220, where it backfills into the penstock 160. As noted above, the ability of the compressed air to provide impetus to the water permits an arrangement as shown in FIG. 9. As also noted, other arrangements are possible.

As also shown in FIG. 9, CCR may be used as a construction material to encase all or substantially all of the operating components of the facility 10, not just the compressed air storage reservoir 212.

Figure 10:
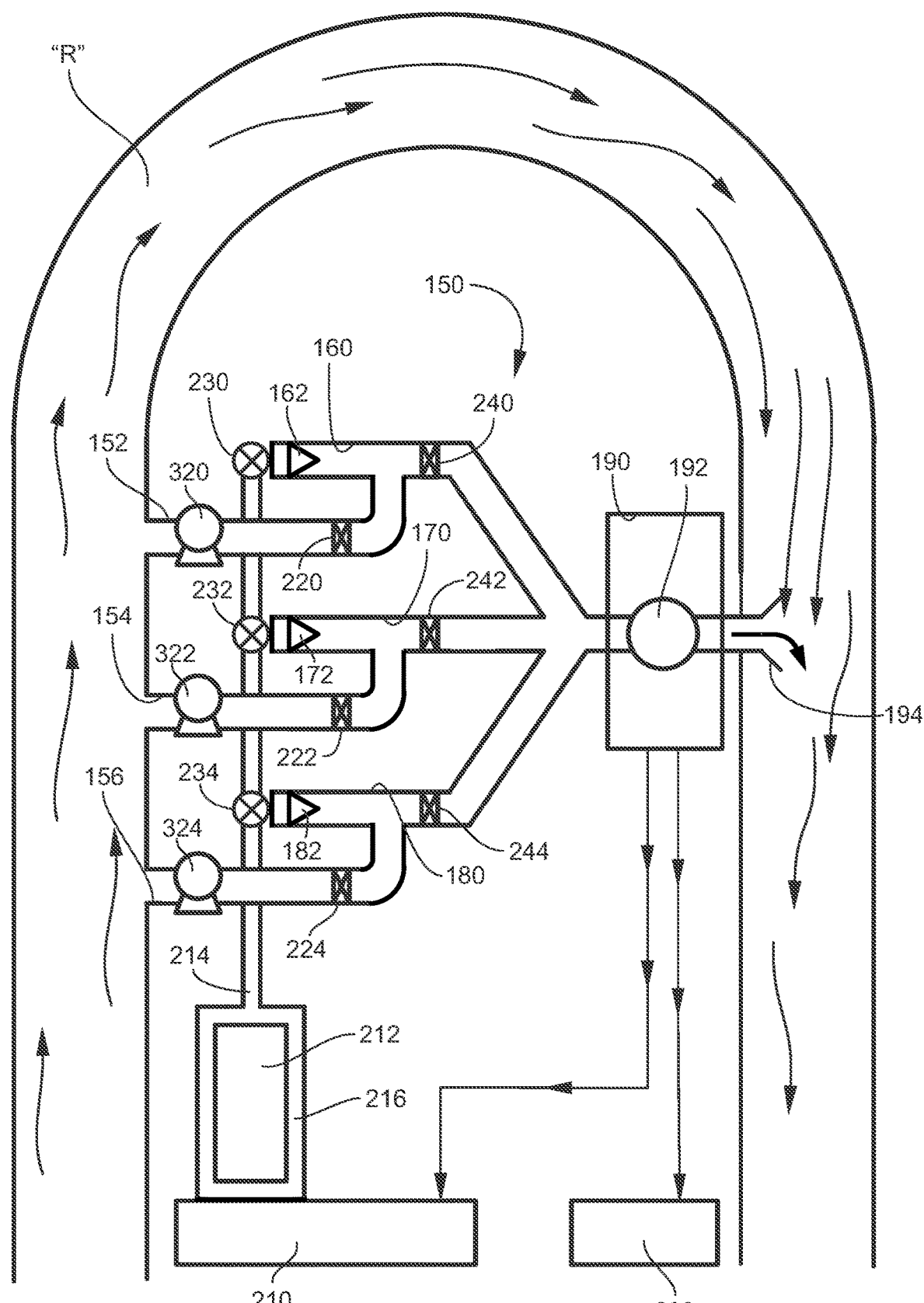
FIG. 10 is an additional alternative schematic plan view of an apparatus and method for generation of electricity using pressurized water and air as respective flow media.

FIG. 10 shows an alternative embodiment of the facility 150 from FIGS. 5-9 where each water intake 152, 154, 156 includes a pump 320, 322, 324. This alternative embodiment is shown in conjunction with the facility 150 of the sequence from FIGS. 5-9 but can also be used in conjunction with other sequences and embodiments such as found in FIGS. 1-4. The sequencing and operation of the facility is controlled by suitable software that is programmed to monitor operation of the facility 150, open and close valves, and turn on and off pumps according the description of this application. While the pumps 320, 322, 324 are shown located upstream of the water inflow valves 220, 222, 224, they can alternatively be directly coupled to or located downstream of the water inflow valves 220, 222, 224. The pumps 320, 322, 324 can use a parasitic load to pump water into one or more of the penstocks 160, 170, 180 when used in conjunction with the valves 220, 222, 224 and the suitable software controls. This forced pumping enables the facility 150 to be located on bodies of water that have reduced or minimal flow rates such as smaller rivers and lakes or located at a lower elevation than the facility 150.

While water has been described as the vehicle for rotating the turbines 52 and 192, other non-compressible flow media may be used, including various comminuted flowable solids, such as stone, ceramic, metal, resins and the like. In such instances the comminuted materials are contained in a closed system by which they fall under the influence of gravity through a turbine and are carried by conveyer back to an upstream position for introduction into one or more penstocks.

An apparatus and method for generation of electricity using pressurized water and air as respective flow media according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A facility for generating electricity, comprising:
   (a) a water source;
   (b) first and second penstocks adapted for selective flow communication with the water source for delivering water from the water source to a turbine electricity generator, each of the first and second penstocks including a respective water inflow valve positioned upstream of the penstock and downstream of the water source and a respective water outflow valve positioned downstream of the penstock and upstream of the turbine electric generator;
   (c) an air compressor for supplying compressed air to a compressed air storage reservoir;
   (d) computer controlled compressed air outlets for selectively delivering the compressed air to the plurality of penstocks according to a predetermined sequence, wherein:
      (i) as the water inflow valve of the first penstock closes and the water outflow valve of the first penstock opens to discharge the water in the first penstock under air pressure to the turbine electric generator;
      (ii) the water inflow valve of the second penstock opens and the water outflow valve closes to recharge the penstock with water from the water source;
      (iii) the steps (d)(i) and (d)(ii) repeat in sequential coordination converting alternating water discharge from the first and second penstocks and alternating water recharge into the first and second penstocks from the water source into serial continuous water flow to the turbine electric generator; and
   (e) an electricity distribution system operatively associated with the turbine electric generator and having a first distribution component adapted to deliver electricity generated by the turbine electricity generator to an electric grid and a second distribution component adapted to use electricity generated by the turbine electricity generator to power the air compressor.

2. A facility for generating electricity according to claim 1, and including a pump positioned within or adjacent to a water intake for moving water from the water source into the penstocks.

3. A facility for generating electricity according to claim 1, wherein at least a portion of the facility components are contained within a structure constructed at least in part of coal combustion residual.

4. A facility for generating electricity according to claim 1, wherein the penstocks converge to form a single outflow to the turbine electricity generator.

5. A facility for generating electricity according to claim 1, wherein the compressed air is in flow communication with the water in the selected penstock.

6. A facility for generating electricity according to claim 1, wherein each of the first and second penstocks includes a piston positioned in the penstock downstream from the compressed air inflow valve and movable downstream within the penstock by compressed air discharged from the compressed air inflow valve on an upstream side of the piston.

7. A facility for generating electricity according to claim 1, wherein the water intakes are laterally offset from the respective first and second penstocks and connect to a respective penstock for water flow into the penstocks at a position downstream of the compressed air inflow valves and upstream of the water outflow valves, and further wherein a piston is positioned in each of the penstocks upstream of the respective water outflow valve and downstream of the respective compressed air inflow valve and movable downstream within the penstocks by compressed air discharged from the compressed air inflow valve on the upstream side of the piston.

8. A facility for generating electricity, comprising:
   (a) a water source selected from the group consisting of a river, channel, canal, lake, or CCR pond;
   (b) a plurality of penstocks adapted for selective flow communication with the water source for delivering water from the water source to a turbine electricity generator, each of the plurality of penstocks including a respective water inflow valve positioned upstream of the penstock and downstream of the water source and a respective water outflow valve positioned downstream of the penstock and upstream of the turbine electric generator;
   (c) an air compressor for supplying compressed air to a compressed air storage reservoir;
   (d) computer controlled compressed air outlets for selectively delivering the compressed air to the plurality of penstocks according to a predetermined sequence, wherein:
      (i) as the water inflow valve of one of the plurality of penstocks closes and the water outflow valve of one of the plurality of penstocks opens to discharge the water in one of the plurality of penstocks under air pressure to the turbine electric generator;
      (ii) the water inflow valve of another of the plurality of penstocks opens and the water outflow valve of another of the plurality of penstocks closes to recharge the penstock with water from the water source;
      (iii) the steps (d)(i) and (d)(ii) repeat in sequential coordination converting sequential repeating water discharge from the plurality of penstocks and sequential repeating water recharge into the plurality of penstocks from the water source into serial continuous water flow to the turbine electric generator;
   (e) an electricity distribution system having a first component adapted to deliver electricity generated by the turbine electricity generator to an electric grid and a second component adapted to use the electricity to power an air compressor;
   (f) a water intake positioned between the water source and the plurality of penstocks; and
   (g) a pump positioned within or adjacent to the water intake for moving water from the water source into the penstocks.

9. A facility for generating electricity according to claim 8, wherein the penstocks converge to form a single outflow to the turbine electricity generator.

10. A facility for generating electricity according to claim 9, wherein the compressed air is in flow communication with the water in the selected one of the plurality of penstocks and each of the plurality of penstocks includes a piston positioned in the penstock downstream from the compressed air inflow valve and movable downstream within the penstock by compressed air discharged from the compressed air inflow valve on an upstream side of the piston.

11. A facility for generating electricity according to claim 10, wherein the water intakes are laterally offset from the respective plurality of penstocks and connect to a respective penstock for water flow into the penstocks at a position downstream of the compressed air inflow valves and upstream of the water outflow valves, and further wherein a piston is positioned in each of the plurality of penstocks upstream of the respective water outflow valve and downstream of the respective compressed air inflow valve and movable downstream within the penstocks by compressed air discharged from the compressed air inflow valve on the upstream side of the piston.

* * * * *